United States Patent [19]
Citta et al.

[11] Patent Number: 6,044,083
[45] Date of Patent: Mar. 28, 2000

[54] SYNCHRONOUS CODE DIVISION MULTIPLE ACCESS COMMUNICATION SYSTEM

[75] Inventors: Richard W. Citta, Oak Park; Stephen M. Dicke, Evanston; David A. Willming, Palatine, all of Ill.

[73] Assignee: Zenith Electronics Corporation, Glenview, Ill.

[21] Appl. No.: 08/659,123

[22] Filed: Jun. 4, 1996

Related U.S. Application Data

[60] Provisional application No. 60/005,712, Oct. 20, 1995.

[51] Int. Cl.[7] .................................................. H04J 13/04
[52] U.S. Cl. ........................................ 370/441; 375/206
[58] Field of Search .................................. 370/252, 320, 370/335, 342, 441; 375/200, 206, 208; 455/501

[56] References Cited

U.S. PATENT DOCUMENTS 5,461,610 10/1995 Weerackody .............................. 370/18
5,619,503 4/1997 Dent ....................................... 370/330

*Primary Examiner*—Min Jung

[57] ABSTRACT

In a synchronous code division multiple access (SCDMA) system, a set of substantially orthogonal code words is selected such that each code word in the set of substantially orthogonal code words is minimally correlated with a channel characteristic such as noise. When a station transmits a data signal, it multiplies the data signal by its assigned code word in order to produce a spread data signal. The spread data signal is transmitted over the channel of the SCDMA system.

58 Claims, 6 Drawing Sheets

SYNCHRONOUS CODE DIVISION MULTIPLE ACCESS COMMUNICATION SYSTEM

RELATED APPLICATION

This application claims the benefit of U.S. Provisional Application Ser. No. 60/005,712 filed Oct. 20, 1995.

TECHNICAL FIELD OF THE INVENTION

The present invention relates to a communication system in which multiple stations share access to a common communication channel according to a code division format.

BACKGROUND OF THE INVENTION

Communication systems typically include a plurality of stations connected to one another over a common communication channel. For example, in a cable television network, a head end is connected to a plurality of subscriber stations by way of a cable plant. The cable plant typically includes a trunk line, a plurality of feeder lines connected to the trunk line, and a plurality of drop lines connected to each of the feeder lines by way of corresponding taps. Also, because long trunk and feeder line runs are typical in a cable television network, the cable plant also includes a plurality of amplifiers or repeaters which are positioned at periodic intervals along the trunk line and the feeder lines in order to boost the cable signal.

The trunk line, feeder lines, and drop lines of the cable plant support downstream communication from the head end to the subscriber stations and upstream communication from the subscriber stations to the head end. The portion of the cable plant which supports upstream communication is usually referred to as the upstream cable plant. Similarly, the portion of the cable plant which supports downstream communication is usually referred to as the downstream cable plant.

Accordingly, when the head end communicates with a destination subscriber station, it transmits a message through the downstream cable plant. That is, when the head end communicates with a destination subscriber station, it transmits a message downstream over the trunk line, then over the feeder lines to a tap to which the destination subscriber station is connected, and then over a drop line from the tap to the destination subscriber station. On the other hand, when a subscriber station communicates with the head end, it transmits a message through the upstream cable plant. Thus, when a subscriber station communicates with the head end, it transmits a message upstream through its drop line to a tap, through the feeder line to which the tap is connected, and then through the trunk line to the head end.

In a cable television network, the head end and subscriber stations must share the resources of the cable in some manner. For example, downstream and upstream communication is typically allocated to two different frequency ranges. In a sub-split allocation, the downstream transmission is allocated to a frequency range between 54 MHz and 750 MHz and above, while the upstream transmission is allocated to a frequency range below 42 Mhz. In a mid-split allocation, downstream transmission is allocated to a frequency range of 162 MHz and above, while upstream transmission is allocated to a frequency range between 5 to 100 MHz. In a high-split allocation, downstream transmission is allocated to a frequency range of 234 MHz and above, while upstream transmissions are allocated to a frequency range between 5 MHz and 174 MHz.

Moreover, the subscriber stations must also share the resources of the cable in some manner. In a time division multiple access (TDMA) cable television network, the subscriber stations share the cable by transmitting data during uniquely assigned and non-overlapping time periods. In a frequency division multiple access (FDMA) cable television network, the subscriber stations share the cable by dividing up the available frequency bandwidth into numerous narrow frequency channels and by allocating to each subscriber station its own corresponding narrow frequency band.

In a code division multiple access (CDMA) cable television network, the communication channel is divided up in neither the frequency domain nor the time domain. Instead, the subscriber stations share the cable by multiplying their data messages by corresponding assigned code words (which may be referred to as code vectors) and then transmitting the result. In effect, this multiplication spreads the data out in the frequency domain allocated to the station. To receive this data, the head end must correlate the data as received with its own set of related code words in order to recover the original data. Therefore, a CDMA cable television network is not constrained by time or frequency as are TDMA and FDMA cable television networks.

Moreover, because of attenuation of the data signals resulting from the propagation of the data signals through long lengths of cable in cable television networks, the data signals are typically amplified by the aforementioned amplifiers or repeaters to a high level at the head end and at various points along the length of the cable. Then, at the point where each subscriber station is connected to the feeder cable, the signal power level must be attenuated so as to supply a consistent signal power level to the subscriber station. The amount of attenuation that is required is typically within the range of 10 to 30 dB. Larger attenuation is required if the subscriber station immediately follows the head end or an amplifier and, because of the loss on the cable, progressively smaller amounts of attenuation are required as the distance between the subscriber stations and the head end or amplifier increases. The power level supplied to the subscriber station is usually controlled within the range of zero to 10 dBmV.

A significant problem associated with the upstream cable plant is ingress. Ingress is the pickup of stray radio wave signals (defined here as ingress noise) by the cable plant. Amplification within the upstream cable plant causes ingress noise funneling. That is, the head end sees all of the ingress noise picked up over all of the cable plant. A successful upstream cable television network must deal with the ingress noise in order to achieve best performance.

Associated with the ingress problem is a problem of egress. Egress is the radiation of electromagnetic radiation from the cable plant. Because the cable plant is an efficient receiving antenna for ingress, it is likewise an efficient radiating antenna for any signals that are transmitted over the cable plant. Ingress and egress result principally from poor shielding in the drop portion of the cable plant (i.e., the drop lines) and within the subscriber station.

The present invention is directed to a synchronized CDMA (SCDMA) system which is relatively unconstrained along both the time and frequency axes, which deals with ingress in an efficient manner, and which also reduces the power spectral density of any egress radiation that may be caused by the upstream signal.

SUMMARY OF THE INVENTION

In accordance with one aspect of the present invention, a method of transmitting a data signal over a communication channel comprises the steps of (i) selecting a set of substantially orthogonal code words such that each code word in the set of substantially orthogonal code words is minimally correlated with a characteristic of the communication channel, and (ii) using a code word of the set of code words in order to transmit the data signal over the communication channel.

In accordance with another aspect of the present invention, a method of transmitting a data signal over a communication channel comprises the steps of (i) selecting a set of substantially orthogonal code words such that each code word in the set of substantially orthogonal code words is minimally correlated with noise on the communication channel, (ii) multiplying the data signal by a code word of the set of substantially orthogonal code words in order to produce a spread data signal, and (iii) transmitting the spread data signal over the communication channel.

In accordance with yet another aspect of the present invention, an apparatus for transmitting a data signal over a communication channel comprises (i) means for determining a set of substantially orthogonal code words such that each code word in the set of substantially orthogonal code words is minimally correlated with noise on the communication channel, (ii) means for modulating the data signal with a code word of the set of substantially orthogonal code words, and (iii) means for transmitting the modulated data signal over the communication channel.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
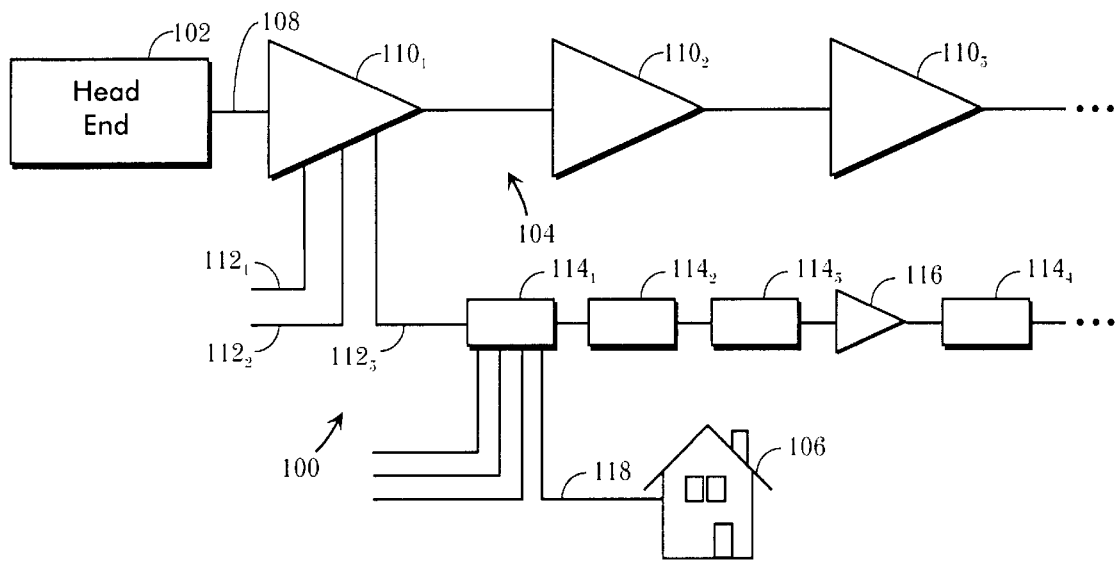
FIG. 1 is a schematic diagram of a cable television system which includes a head end connected to a subscriber station by way of a communication channel and which is exemplary of a communication system configured in accordance with the present invention.

A cable television network 100 is shown in FIG. 1 and includes a head end 102 connected by a cable plant 104 to a subscriber station 106. As illustrated in FIG. 1, the subscriber station 106 may be a home, although the subscriber station 106 may be any other premises or station. The cable plant 104 includes (i) a trunk line 108, (ii) a plurality of amplifiers $110_1$, $110_2$, $110_3$ . . . in the trunk line 108, (iii) a plurality of feeder lines, such as feeder lines $112_1$, $112_2$, $112_3$, which branch out from the trunk line 108, (iv) a plurality of taps, such as taps $114_1$, $114_2$, $114_3$, $114_4$ . . . , which are connected into each feeder line, (v) amplifiers, such as an amplifier 116, in each of the feeder lines as necessary, and (vi) a plurality of drop lines, such as a drop line 118 which is connected between the tap $114_2$ and the subscriber station 106. The amplifiers $110_1$, $110_2$, $110_3$, . . . and 116 . . . are bi-directional amplifiers which amplify the data signals being transmitted both in an upstream direction and in a downstream direction. The amplifiers $110_1$, $110_2$, $110_3$ . . . and 116 . . . are used to boost the upstream and downstream data signals because of the long lengths of cable in the cable plant 104.

Communication from the head end 102 to the subscriber stations, such as the subscriber station 106, is referred to as downstream communication. Communication from a subscriber station, such as the subscriber station 106, to the head end 102 is referred to as upstream communication. In order to support both upstream and downstream communications, the head end 102 and each subscriber station, such as the subscriber station 106, are provided with corresponding transmitters and receivers.

The goal of any good communication system design is to enhance the signal-to-noise ratio (SNR) at the output of a receiver. To achieve this maximization, the impact of noise sources must be decreased while at the same time the signal energy at the output of the receiver must be increased. The spread spectrum system described with respect to the present invention achieves an enhanced signal-to-noise ratio.

In a cable television network, ingress associated with the upstream cable plant is a substantial problem. Ingress arises predominantly because of leaks in the shielding at the subscriber stations. These leaks occur as a result of unshielded equipment connected to the cable plant in the subscriber station, the wiring in the subscriber station, and poor shielding of the drop line to the subscriber station.

When ingress is present, so is egress. That is, whenever ingress occurs, radiation (i.e., egress) of the signals present on the cable plant will also be a problem. This problem is of special concern with respect to the design of an upstream communication system because (i) the majority of the egress leakage occurs in the parts of the cable plant where the upstream signal is strongest, and (ii) the power spectral density of the transmitted signal is constrained by the amount of leakage allowed by the FCC (referred to herein as $S_{max}$).

Figure 2:
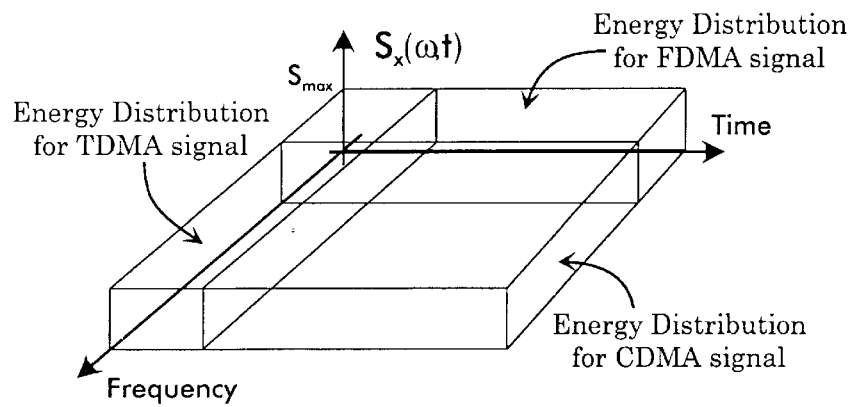
FIG. 2 illustrates comparative power spectral densities for a time division multiple access communication system, a frequency division multiple access communication system, and a code division multiple access communication system.

FIG. 2 illustrates the power spectral density of a time division multiple access (TDMA) system, a frequency division multiple access (FDMA) system, and a code division multiple access (CDMA) system. As shown in FIG. 1, the constraint on the power spectral density as dictated by the FCC is shown as $S_{max}$, As will be discussed in relation to FIG. 6, data bits may be transmitted as data symbols. If so, the energy per data symbol is given by the following equation:

$$E_s = S_{max} T_s W_s \quad (1)$$

where $T_s$ is the time required to transmit a data symbol (i.e., symbol rate), $W_s$ is the bandwidth of the signal, $S_{max}$ is the power spectral density limit, and $E_s$ is the energy per transmitted data symbol. The energy per transmitted bit, on the other hand, depends upon the number of modulation levels M which are used to transmit a data symbol and is given by the following equation:

$$E_b = \frac{E_s}{\log_2 M} \tag{2}$$

where $E_s$ is again the energy per data symbol, M is the number of modulation levels used to transmit the data symbol, and $E_b$ is the energy per transmitted bit. For quadrature amplitude modulation (QAM), the symbol rate and symbol bandwidth are reciprocals according to the following equation:

$$W_s = \frac{1}{T_s} \tag{3}$$

so that the energy per transmitted bit is given by the following equation:

$$E_b = \frac{S_{max}}{\log_2 M} \tag{4}$$

In either TDMA or FDMA systems utilizing quaternary phase shift keying (QPSK) modulation, the energy per transmitted bit is given by the following equation:

$$E_b = \frac{S_{max}}{2} \tag{5}$$

because there are four modulation levels M (i.e., M=4). However, for CDMA systems, the data symbol rate and the signal bandwidth are not reciprocals. Instead, the signal bandwidth is given by the following equation:

$$W_s = \frac{1}{T_c} = \frac{L}{T_s} \tag{6}$$

where $W_s$ is the bandwidth of the signal as before, $T_s$ is the time to transmit a data symbol as before, $T_c$ is the time to transmit a code word, and L is the ratio of bandwidth expansion caused by the spreading signal. Assuming QPSK modulation in the CDMA system (M=4), the energy per transmitted bit, therefore, is derived from equations (1), (2), and (6) and is given by the following equation:

$$E_b = \frac{S_{max} L}{\log_2 M} = \frac{S_{max} L}{2}. \tag{7}$$

As shown in FIG. 2, the amount of transmitted signal energy in a transmitted data signal is the volume of each of the boxes. Accordingly, the TDMA system spreads its signal energy over the frequency axis but is confined along the time axis. On the other hand, the FDMA system spreads its energy over the time axis but confines the energy to a narrow frequency band along the frequency axis. By contrast, the CDMA system spreads its energy out along both the frequency and the time axes. Therefore, as is evident by comparing equations (5) and (7), the CDMA system can achieve both (i) a higher amount of transmitted energy per bit than either the TDMA or the FDMA system and (ii) a transmitted energy that is below $S_{max}$.

The limit on the amount of transmitted or radiated power by the upstream transmitter (i.e., the upstream cable plant) is imposed because of egress. The present invention produces a high signal-to-noise ratio at the output of the receiver by increasing and spreading the transmitted energy per bit $E_b$ and by rejecting the interfering ingress noise present at the receiver. That is, by spreading the transmitted energy and by rejecting ingress noise, the signal-to-noise ratio may be improved to the point where the transmitted energy is sufficiently large to transmit the data upstream to the head end 102 but not so large that egress is a problem.

However, in a TDMA system, each subscriber station occupies the full transmission channel for a slotted period of time. Use of the channel is shared by time multiplexing the channel resources among the subscriber stations. Because the energy per bit is confined to a small time window, the power spectral density is large.

In an FDMA system, the available frequency allocation is divided up into smaller narrowband channels. The energy per bit in this type of system is spread out in time but is confined in the frequency domain. Because the energy per bit is confined to a narrow frequency band, the power spectral density is large, as it is in a TDMA system.

By contrast, in a CDMA system, the available channel resources are shared simultaneously in both time and frequency among the subscriber stations of the network. The ability to simultaneously share the channel in both time and frequency is accomplished by signal waveforms that do not interfere with each other. With such a system, the energy per bit is spread out in both frequency and in time and, consequently, the power spectral density is small. Therefore, a higher transmitted energy per bit is realized without exceeding the FCC's limit $S_{max}$ on power spectral density. Because other proposed systems which utilize QPSK/QAM/DMT or DWMT are TDMA systems, they will yield a lower energy per bit than an CDMA system.

Figure 3:
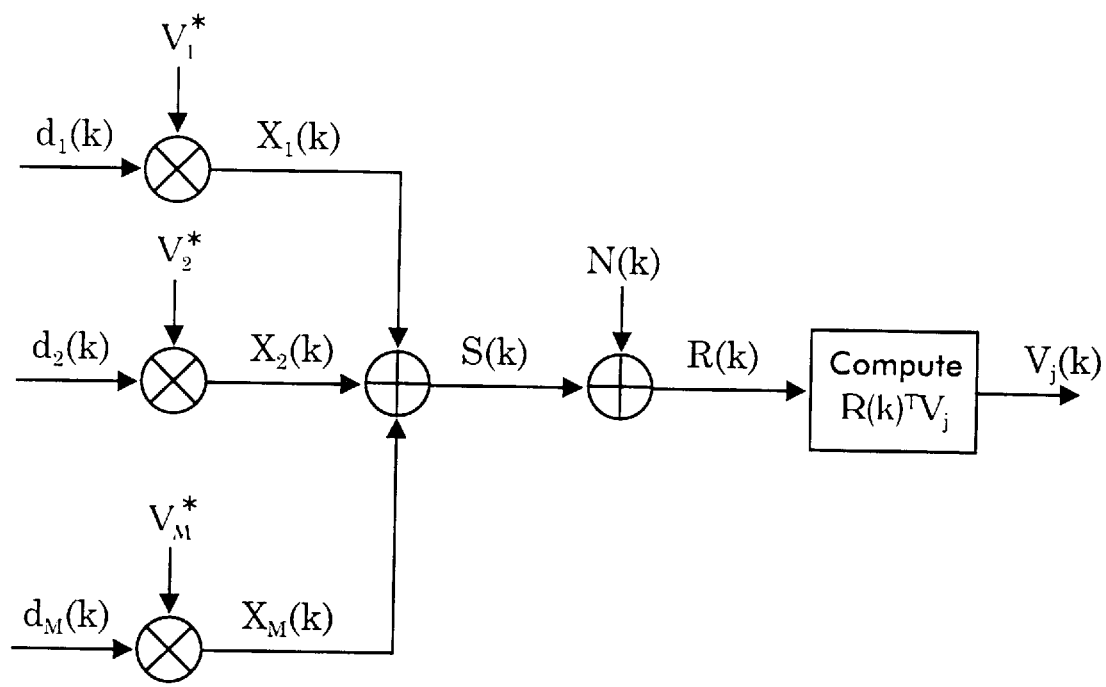
FIG. 3 shows a model of an SCDMA communication system useful in explaining the present invention.

FIG. 3 illustrates a model of a synchronized CDMA (SCDMA) communication system that uses orthogonal code words in order to transmit data signals in accordance with the present invention. The transmitters are preferably synchronized to a downstream reference signal. In such a system, each data channel is assigned one of a plurality of code words $V_j$. The code words $V_j$ are column vectors that have L (possibly complex) components. These code words are defined to be orthonormal. This orthonormality means that the code words have unit energy and zero cross correlation. Such code words are given by the following equation:

$$V_i^{*T} V_j = \begin{cases} 0 & i \neq j \\ 1 & i = j \end{cases}, \tag{8}$$

where the * denotes complex conjugate and T denotes matrix transpose. With respect to the model shown in FIG. 3, a plurality of data signals, $d_1(k)$, $d_2(k)$, ... $d_M(k)$, contain the information to be transmitted along the communication channel of the SCDMA communication system. Each data symbol of each data signal is multiplied by a corresponding code word $V^*_1$, $V^*_2$, ... $V^*_M$ thus producing a corresponding plurality of output vectors, $X_1$, $X_2$ ... $X_M(k)$. Accordingly, the output vectors are given by the following equation:

$$X_j(k) = d_j(k) V^*_j. \tag{9}$$

These output vectors are summed to produce a composite signal S(k) given by the following equation:

$$S(k) = \sum_{i=1}^{M} x_i(k) = \sum_{i=1}^{M} d_i(k) v_i^*. \quad (10)$$

For each composite output vector, a random noise vector, N(k), is added to the composite signal. Thus, the received vector, R(k), may be given by the following equation:

$$R(k)=S(k)+N(k). \quad (11)$$

To recover a specific data signal $d_j(k)$ from the received vector R(k), a receiver performs a correlation of the received vector R(k) against the complex conjugate of the code word $V_j$ of the desired data channel. The output of this correlation is $v_j(k)$ and is given by the following equation:

$$v_j(k) = R(k)^T V_j = \left( \sum_{i=1}^{M} d_i(k) V_i^* \right)^T V_j + N(k)^T V_j. \quad (12)$$

Because the set of code words Vi are selected to be orthogonal to each other, the output of the correlation can be expressed according to the following equation:

$$v_j(k)=d_j(k)+N(k)^T V_j. \quad (13)$$

From equation (13), it can be seen that the receiver output $v_j(k)$ contains the desired data signal $d_j(k)$, and a noise component $N(k)^T V_j$. Also, because the code words $V_j$ are orthogonal to each other, the noise components of the receiver outputs $v_j(k)$ from the other data channels (which are defined by the other code words $V_j$) are removed by the correlation process.

At this point, the signal power to noise power ratio at the output of the correlation receiver can be computed. The signal power is the power in the desired signal components. The power in the desired signal components is the power in the data signal $d_j(k)$, and the power in the data signal $d_j(k)$ is given by the following equation:

$$S=E\{(d_j(k))^2\}. \quad (14)$$

The noise power at the receiver output is more complicated and is given by the following equation:

$$E\{\eta\eta^*\}=E\{(N(k)^T V_j)(N(k)^T V_j)^*\} \quad (15)$$

which may be simplified according to the following equation:

$$E\{\eta\eta^*\}=V_j^T E\{N(k)N(k)^{*T}\}V_j^*. \quad (16)$$

The function E{x} denotes that the expected value of the random variable x is determined such as by the following equation:

$$E\{x\} = \int_{-\infty}^{+\infty} x \cdot p_x \cdot dx \quad (17)$$

where x in the integral is a value in the range of x and $p_x$ is the probability with which that value occurs. The expectation $R_N=E\{N(k)N(k)^{*T}\}$ is the noise correlation matrix. Hence, the noise power at the output of the receiver is given by the following equation:

$$J=E\{\eta\eta^*\}=V_j^T R_N V_j^*. \quad (18)$$

The signal-to-noise ratio S/J may determined from equations (14) and (18) according to following equation:

$$\frac{S}{J} = \frac{E\{(d_j(k))^2\}}{V_j^T R_N V_j^*}. \quad (19)$$

To maximize this signal-to-noise power ratio, it is necessary to minimize the noise power J at the output of the receiver. This minimization of the noise power J at the output of the receiver is attained by appropriate design of the code words in the manner that depends upon the noise correlation matrix.

Figure 4A:
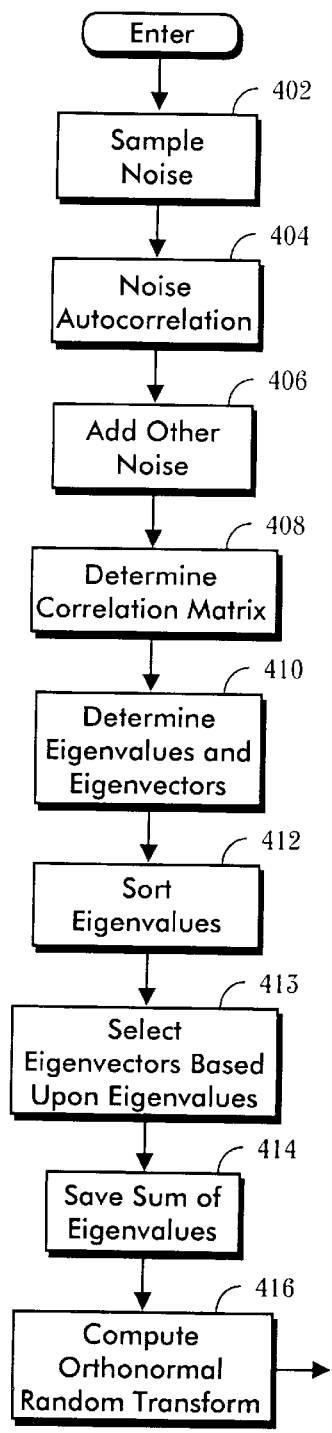
FIGS. 4A and 4B illustrate a flow chart of a procedure for determining a set of substantially orthogonal code words such that each code word in the set of substantially orthogonal code words is minimally correlated with noise on the communication channel shown in FIG. 1.
Figure 4B:
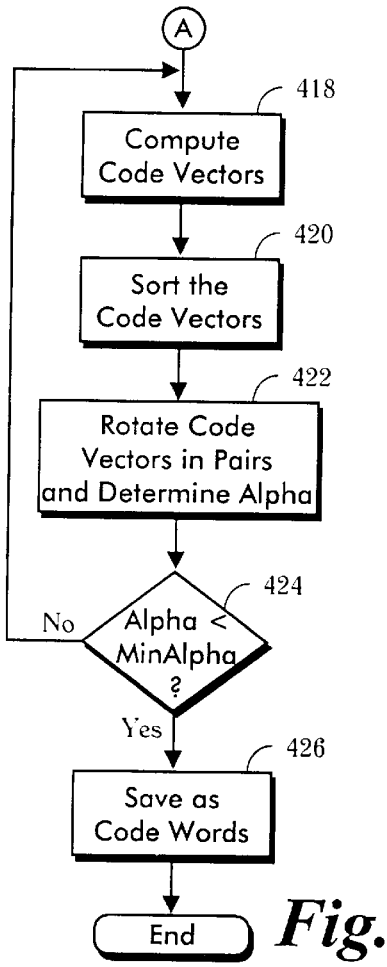

These code words may be determined by a processor in the head end 102 according to the flow chart illustrated in FIGS. 4A and 4B. As shown therein, a block 402 first samples the ingress noise on the communication channel. This noise sampling may be done in one of two ways. For example, the ingress noise on the cable may be directly sampled while the head end 102 and all subscriber stations 106 are silent (i.e., not broadcasting). On the other hand, the cable may be sampled during broadcast by one of the subscriber stations 106 and the data transmitted by the broadcasting subscriber station 106 may be subtracted from the sample leaving only the ingress noise. In either approach, the result is a set of data from which the noise statistics may be computed.

A block 404 estimates the autocorrelation of the noise based upon the noise samples acquired by the block 402. The block 404 may estimate this autocorrelation according to the following equation:

$$r_i = \frac{1}{M} \sum_{j=0}^{M-1} n_{i+j} \cdot \overline{n_i} \text{ for } i = 0 \ldots +N \quad (20)$$

and $$r_{-i} = \overline{r_i} \quad (21)$$

where the overline denotes a complex conjugate, n is a noise sample, N is the number of the desired code words, and M+N is the number of noise samples. The autocorrelation $r_i$ is a statistical measure of the predictability present in the noise.

A block 406 adds bandlimited white Gaussian noise to the autocorrelation $r_i$ in an amount dependent upon the bandlimited white Gaussian noise which is likely to occur from sporadic sources of noise. Such sources may include HAM, CB, or other bursty traffic with bands defined by the FCC. The addition to the autocorrelation $r_i$ is determined by (i) constructing a multi-bandpass filter using a Remez exchange algorithm for a FIR filter design, (ii) computing the power spectrum of the FIR filter (which is the square of the filter response in the frequency domain), (iii) computing the autocorrelation of the FIR filter (by determining the inverse Fourier transform of the power spectrum), and (iv) truncating the autocorrelation of the FIR filter to a range from −N to +N. This process is presented in *Theory and Application of Digital Signal Processing* by Rabiner and Gold, Prentice Hall, Inc. and *Digital Filter Design* by Parks and Burrus (Wiley-Interscience). The addition to the autocorrelation $r_i$ is performed because these types of bandlimited noise may not have been present when the noise samples were taken, but they are expected to be intermittently present during operation of the cable television network.

A block 408 then fills in a correlation matrix R according to the following rule:

$$R_{i,j}=r_{i-j} \quad (22)$$

This correlation matrix R is used for many signal processing applications and is used here to design a set of optimum filters in order to reduce ingress noise during reception and egress during transmission in the SCDMA system of the present invention.

A block 410 computes the right-hand eigenvalues $\lambda_i$ and eigenvectors $\phi_i$ for the correlation matrix R. The correlation matrix R is Hermitian, and there are several methods for computing its eigenvalues $\lambda_i$ and its eigenvectors $\phi_i$ including Jacobi transformations or Householder reduction followed by QL iteration. (See Numerical Recipes in C, 2nd edition, W. Press, et al., Cambridge University Press, 1992). These eigenvalues $\lambda_i$ and eigenvectors $\phi_i$ of the correlation matrix R satisfy the following matrix equation:

$$R \cdot \phi_i = \lambda_i \cdot \phi_i. \tag{23}$$

It is well known that eigenvectors optimally pack the most variance into the fewest number of vectors. (See H. Hotelling in the 1933 Journal of Educational Psychology, Vol. 24, pp. 268–277.) The eigenvalues are the variance associated with the eigenvectors. This variance is the expected noise power output if the eigenvectors are used to filter the noise. Accordingly, $$\langle \overline{n^T \cdot \phi_i} \cdot n^T \cdot \phi_i \rangle = \phi_i^T \cdot \langle \overline{n \cdot n^T} \rangle \cdot \phi_i = \overline{\phi_i^T} \cdot R \cdot \phi_i = \overline{\phi_i^T} \cdot \lambda_i \cdot \phi_i = \lambda_i. \tag{24}$$

where the eigenvectors $\phi_i$ are orthonormal according to the following equation:

$$\overline{\phi_i^T} \phi_j = \begin{cases} 0 & \text{if } i \neq j \\ 1 & \text{if } i = j \end{cases} \tag{25}$$

and $$R = \langle \overline{n \cdot n^T} \rangle \tag{26}$$

and where the function (x) is the expected value of x.

A block 412 sorts the eigenvalues $\lambda_i$ from smallest to largest (for example, using the heap-sort algorithm of Numerical Recipes in C). The smallest eigenvalues $\lambda_i$ are of particular interest because their eigenvectors $\phi_i$ have the lowest expected noise power output.

Thereafter, a block 413 selects the eigenvectors $\phi_i$ corresponding to the smallest eigenvalues $\lambda_i$ and a block 414 sums these smallest eigenvalues $\lambda_i$. If the average of the summed eigenvalues $\lambda_i$ is not greater than a predetermined threshold (for example, −16 dB for two bits per code word in a system which transmits one symbol based on two bits of data), the block 413 selects the eigenvector $\phi_i$ corresponding to the next larger eigenvalue $\lambda_i$ and the block 414 sums this next larger eigenvalue $\lambda_i$ with the eigenvalues $\lambda_i$ previously summed. This process is repeated until the sum of eigenvalues $\lambda_i$ would have been greater than the predetermined threshold but for the eigenvalue $\lambda_i$ corresponding to the latest selected eigenvector $\phi_i$. These eigenvalues $\lambda_i$ (M in number) and their corresponding eigenvectors $\phi_i$ (i.e., not including the latest eigenvector $\phi_i$ whose eigenvalue $\lambda_i$ would have increased the sum of eigenvalues $\lambda_i$ beyond the predetermined threshold) are then selected for further processing as disclosed hereinafter. Accordingly, for a given signal constellation, a noise level threshold is established which must be exceeded by some margin in order to ensure proper operation of the system. For a 4 point constellation, the minimum noise level is −10 dB or lower and may be −16 db by including a 6 dB margin.

A block 416 computes an M-dimensional real orthonormal random transform. This transform represents the components of the first pass code words in the eigenspace defined by the eigenvectors $\phi_i$. The M-dimensional real orthonormal random transform is computed by generating M vectors, wherein each vector is N-dimensional and has uniform pseudo-random numbers in the range $\{+1, -1\}$, and by performing Gram-Schmit orthogonalization on these vectors. Thus, the following procedure is implemented:

$$u_0 = v_0 \tag{27}$$

$$u_i = v_i - \sum_{j=0}^{i-1} \frac{v_i^T \cdot u_j}{u_j^T \cdot u_j} \cdot u_j \text{ for } i = 1...M - 1 \tag{28}$$

$$w_i = \frac{u_i}{|u_i|}. \tag{29}$$

where $|u_i|$ denotes the L2 Norm or the Euclidean length of a vector $u_i$. This procedure generates a set of M orthonormal random code vectors $w_i$ which have not, as yet, been constrained by noise but which will be used to transform the noise dependent eigenvectors $\phi_i$, as described below. The eigenvectors of many correlation matrices have poor frequency and time domain responses. The above transform, however, will make the code words have nearly flat power spectrums and random time domain responses.

A block 418 computes an inverse random transform of the selected noise dependent eigenvectors $\phi_i$ according to the following equation:

$$x_i = \sum_{k=0}^{M-1} w_{ik} \cdot \phi_k. \tag{30}$$

Thus, a set of orthonormal random code vectors ($w_i$'s) and a set of orthonormal noise eigenvectors ($\phi_i$'s) generate an orthonormal set of code vectors ($x_{(i)}$'s) which are, accordingly, minimally correlated to the noise samples. The set $x_i$ represents a set of code vectors which are further processed as described below in order to produce the set of code words to be used for the transmission of data.

A block 420 sorts the code vectors $x_i$ by relative expected noise power J(i) where the expected noise power J(i) may be given according to the following equations:

$$N(i, j) = \sum_{k=0}^{M-1} w_{ik} \cdot w_{jk} \cdot \lambda_k \tag{31}$$

and $$J(i) = N(i, i). \tag{32}$$

The inverse random transform does not do a perfect job of equalizing the expected noise power among the M code vectors x(i). To further balance these code vectors, the higher power code vectors are combined with lower power code vectors and are rotated in the plane of the rotated code vectors until the relative expected characteristic noise power converges to substantially a total average characteristic noise expected power.

That is, a block 422 rotates the code vectors $x_i$ in pairs wherein a first pair of code vectors $x_i$ comprises the code vector $x_i$ having the smallest noise power J(i) and the code vector $x_j$ having the largest noise power J(j), a second pair of code vectors $x_i$ comprises the code vector $x_i$ having the second smallest noise power J(i) and the code vector $x_j$ having the second largest noise power J(j), and so on. These code vector pairs are rotated by an angle α. The angle α is chosen so that the expected noise power J(i) of the rotated code vector pair is the average of the expected noise power of the two original code vectors and is given by the following equation:

$$\alpha = \frac{1}{2}\arctan\left(\frac{N(j,j) - N(i,i)}{N(i,j) - N(j,i)}\right). \quad (33)$$

Accordingly, the code vector pairs $x_i$ and $x_j$ are rotated according to the following equations:

New $x_i = (\cos \alpha) \cdot x_i + (\sin \alpha) \cdot x_j$ (34)

New $x_j = (-\sin \alpha) \cdot x_i + (\cos \alpha) \cdot x_j$. (35)

These rotated code vectors have new expected noise powers equal to the average of the noise powers of the two original code vectors. So that the new expected noise power J(i) may be recomputed by use of equations (31) and (32), the random code vectors, unconstrained by noise, are also rotated, according to the following equations:

New $w_i = (\cos \alpha) \cdot w_i + (\sin \alpha) \cdot w_j$ (36)

New $w_j = (-\sin \alpha) \cdot w_i + (\cos \alpha) \cdot w_j$. (37)

A block 424 determines whether all the new noise powers J(i)'s for each of the M code vectors are within some tolerance J-Threshold of J-Average (for example, 0.000001). J-Average is the average noise power J(i) for all M code vectors. If there is a noise power J(i) that is not within the tolerance J-Threshold, then the block 420 re-sorts the is modified M code words by their new noise powers J(i)'s, and the block 422 rotates this modified set of M code words again according to equations (31)–(37). Thus, based upon the new $w_i$'s vectors, the angle $\alpha$ is then recomputed, and the recomputed $\alpha$ is used again to rotate the $x_i$, $x_j$, $w_i$, and $w_j$ vectors. The blocks 420 and 422 are then repeated until all of the noise powers J(i)'s are within the tolerance J-Threshold of J-Average.

At this point, a block 426 saves the code words New $x_i$ and New $x_a$ as the code words $V_j$. The head end 12 downloads a code word to each of the subscriber stations 106. These code words $V_j$ will be used during transmission of data from the subscriber stations to the head end 102.

The goals of the above process described in relation to FIGS. 4A and 4B are (i) to produce a set of code words having approximately the same signal-to-noise ratio which is minimized for the set of code words, (ii) to provide a variable upstream bandwidth which is based on the channel signal-to-noise ratio, and (iii) to increase the upstream bandwidth as the cable plant's response to ingress is decreased. Goal (i) is stated mathematically as follows:

Minimize $J = V_j^T R_N V_j^*$ (38)

where J is minimized at the data sample times for the noise vector N. $V_j$ may be decomposed into a linear sum of the correlation matrix's (right hand) eigenvectors so that the noise power J may be given according to the following equation:

$T = (a_1\phi_1 + a_2\phi_2 + \ldots)^T R_N (a_1\phi_1 + a_2\phi_2 + \ldots)$ (39)

where $R_N$ is the noise correlation matrix determined according to equation (22), $\phi_j$ are the eigenvectors determined according to equation (23), and $a_j$ are coefficients. By definition, the eigenvectors $\phi_j$ satisfy the property given in equation (23). Accordingly, equation (39) may be simplified to the following:

$J = (a_1\phi_1 + a_2\phi_2 + \ldots)^T (a_1\lambda_1\phi_1 + a_2\lambda_2\phi_2 + \ldots)^*.$ (40)

Because of the orthonormality of the eigenvectors $\phi_i$, the noise power J may be reduced to the following equation:

$J = a_1^2 \lambda_1 + a_2^2 \lambda_2 + \ldots$ (41)

Thus, the expected signal-to-noise ratio S/J can be determined in part by the linear sum of eigenvalues X of the eigenvectors $\phi_j$ used to make the code words $x_i$.

It is also well known that eigenvectors of the correlation matrix concentrate as much of the noise power in as few eigenvectors as possible (see Karhunen-Loeve Transform for image processing). Thus, by eliminating the eigenvectors $\phi_j$ with the worst eigenvalues $\lambda_j$, as is done by the blocks 412 and 414, the signal-to-noise ratio of the remaining set of eigenvectors $\phi_j$ is controlled. These remaining eigenvectors are then combined randomly by the blocks 416 and 418 to yield roughly equivalent signal-to-noise ratios for the set of code words. The random set is then rotated by the blocks 420–424 where the new expected signal-to-noise ratio is given by the following:

$SNR(newx_1) = (\cos^2 \alpha) \cdot SNR(x_i) + (\sin^2 \alpha) \cdot SNR(x_4) + 2(\cos \alpha \sin \alpha)[SNR(x_1)SNR(x_2)]^{1/2}$ (42)

$SNR(newx_2) = (\sin^2 \alpha) \cdot SNR(x_i) + (\cos^2 \alpha) \cdot SNR(x_4) - 2(\cos \alpha \sin \alpha)[SNR(x_1)SNR(x_2)]^{1/2}$ (43)

The code words $V_j$ saved by the block 426 may be used in an SCDMA system, such as that shown in FIGS. 5–8, in order to transmit data.

Figure 5:
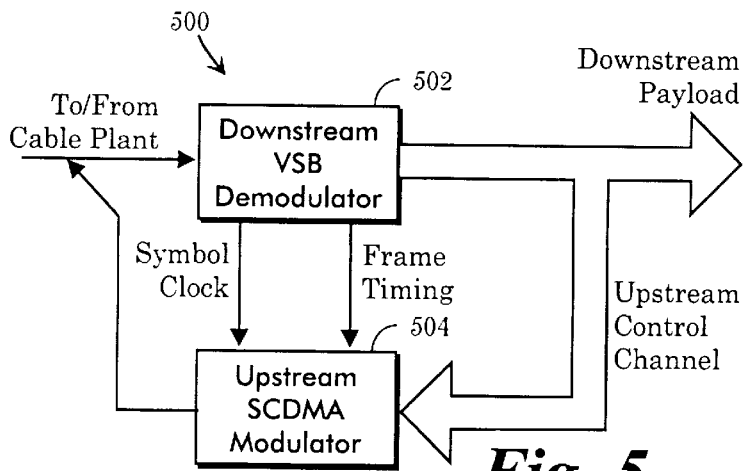
FIG. 5 a modem which includes a downstream VSB demodulator and an upstream SCDMA modulator and which may be used by the subscriber station shown in FIG. 1.

Implementation of the synchronous code division multiple access system (SCDMA) of the present invention requires careful control of the symbol and carrier frequencies. This control may be accomplished in the cable plant 104 because a downstream clock reference can be conveniently supplied. FIG. 5 shows an upstream modem 500 located in the subscriber station 106. As shown in FIG. 5, the upstream modem 500 provides a linkage between its downstream VSB demodulator 502 and its upstream modulator 504. A downstream modem located at the head end 102 supplies a symbol clock frequency reference and frame timing which are extracted by the downstream VSB demodulator 502 for use by the upstream modulator 504.

Figure 6:
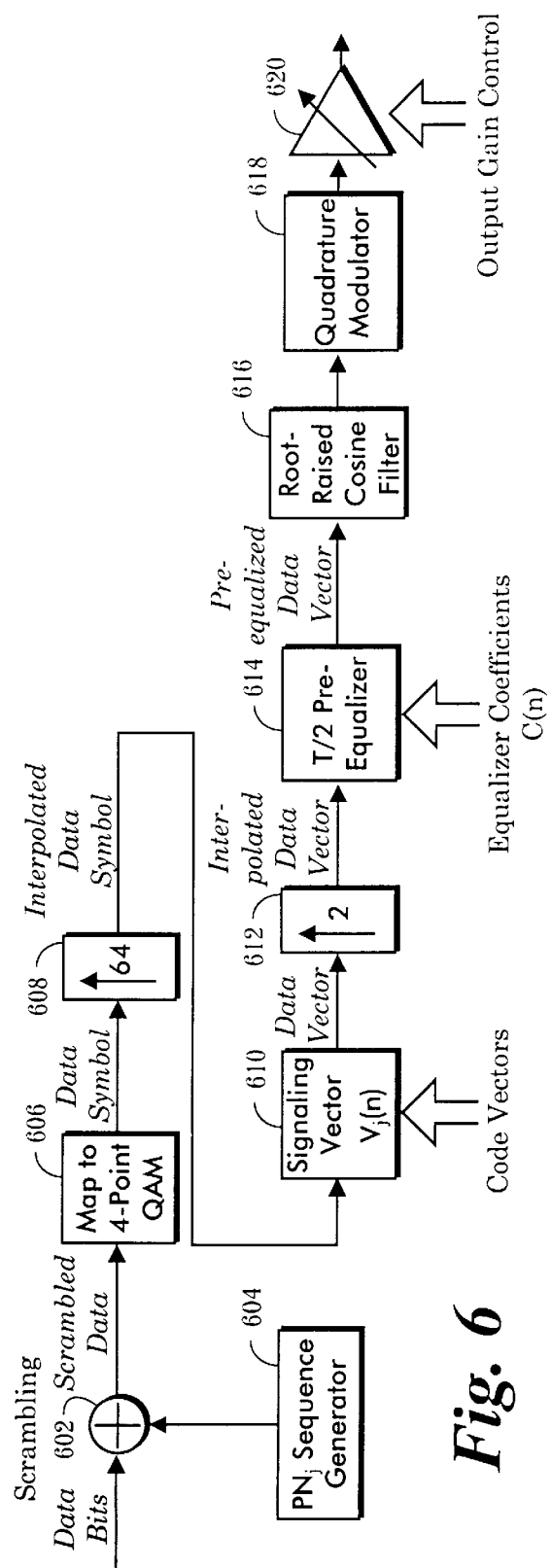
FIG. 6 is a block diagram of the upstream SCDMA modulator of the modem shown in FIG. 5.

FIG. 6 illustrates the upstream modulator 504 in greater detail. As illustrated in FIG. 6, a summer 602 multiplies the data bits to be transmitted upstream to the head end 102 with a pseudorandom number sequence ($PN_j$) provided by a $PN_j$ sequence generator 604 in order randomize the data bits to be transmitted upstream. The randomized data bits are supplied to a mapper 606 which maps each pair of randomized data bits to a four point QAM/QPSK data symbol. These data symbols are interpolated by an interpolator 608, and the interpolated data symbols are supplied to a signalling vector filter 610 which multiplies each data symbol by the code word assigned to the subscriber station 106 by the head end 102. This code word is supplied to the signalling vector filter 610 by an upstream control channel as shown in FIG. 5. The data vector provided at the output of the signalling vector filter 610 is then interpolated by an interpolator 612. The interpolated data vector at the output of the interpolator 612 is equalized by a T/2 pre-equalizer 614 which receives equalizer coefficients C(n) supplied by the upstream control channel. The pre-equalized and interpolated data vector is then applied to a root-raised cosine filter 616 whose output is supplied to a quadrature modulator 618 and then to a gain controller 620. The gain setting of the gain controller 620 is supplied by the upstream control channel. The output of the gain controller 620 is transmitted over the upstream cable plant to the head end 102.

All clocks used by the transmitter shown in FIG. 6 are frequency locked to the symbol clock reference supplied by the downstream VSB demodulator 502. The carrier frequency used by the quadrature modulator 618 is also frequency locked to the symbol clock.

The modem 500 accepts a data input of 168 kbits per second. As discussed above, these data bits are randomized by the summer 602 using a pseudorandom noise sequence provided by the $PN_j$ sequence generator 604. This pseudorandom noise sequence is synchronized to the framing information supplied in the downstream transmissions, and is uniquely defined for each of the 64 possible code words. The purpose of this randomization is to whiten the data pattern and to reduce the cross correlation between code word channels.

The randomized data bits are then grouped in pairs and mapped by the mapper 606 to a four point QAM/QPSK symbol. Extensions to higher numbers of modulator levels are possible. The complex data symbol is then interpolated by 64 by the interpolator 608, and then passed through the signalling vector filter 610. Accordingly, the data signal $d_M(k)$ is multiplied by a code word $V_M$ as indicated in FIG. 3. The output of the signalling vector filter 610 is a data vector having, for example, 64 samples.

The data vector is interpolated by 2 by the interpolator 612 and enters the T/2 pre-equalizer 614. The coefficients of the T/2 pre-equalizer 614 are computed by the receiver of the head end 102 and are transmitted to the upstream SCDMA modulator 504 through the downstream cable plant, the downstream VSB demodulator 502, and the upstream control channel.

The pre-equalized data vector signal is then passed through the root raised cosine filter 616 having a bandwidth of 5.376 MHz. This filtered signal is modulated by the quadrature modulator 618. The power output of the transmitter should be accurately controlled. To this end, the output gain control 620 is adjusted by a gain setting supplied by the control channel for this purpose.

Figure 7:
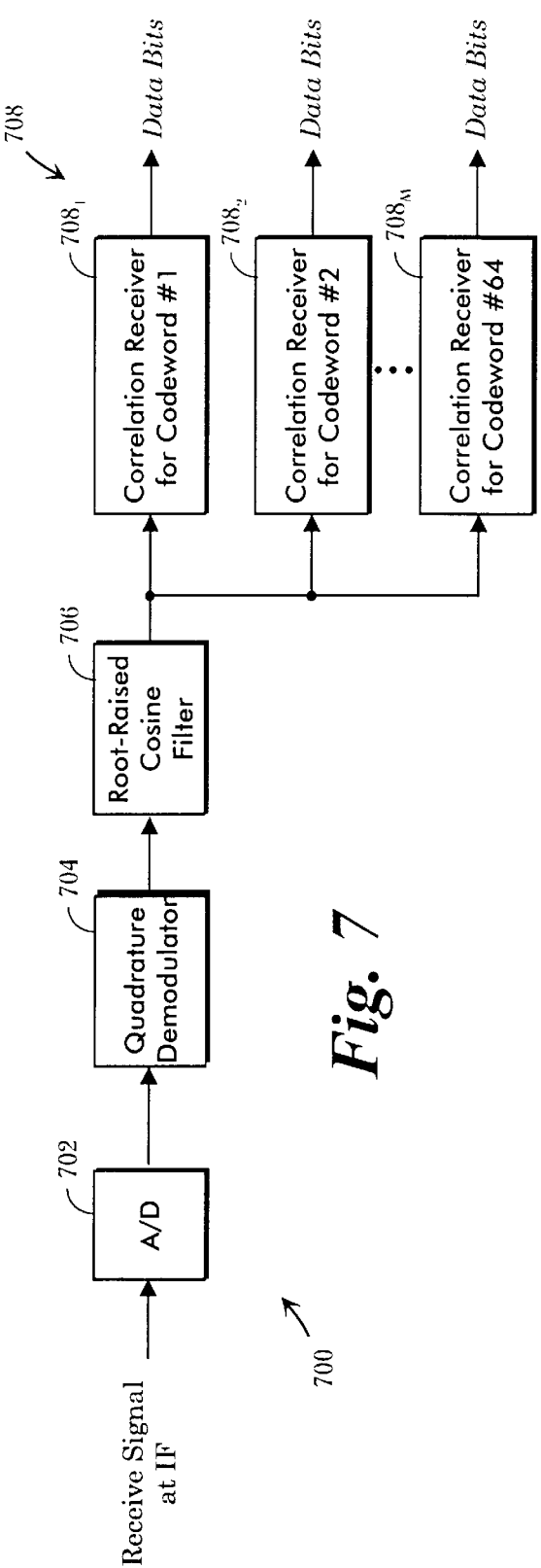
FIG. 7 is a block diagram of a receiver which may be used at the head end of the cable television system shown in FIG. 1.

An SCDMA receiver 700 is shown in FIG. 7 and is located at the head end 102. The received signal from the subscriber station 106 is reduced to an intermediate frequency, is sampled by a single A/D converter 702, and is digitally demodulated by a quadrature demodulator 704. The output of the quadrature demodulator 704 is filtered by a root raised cosine filter 706. The output of the root raised cosine filter 706 is the data vector (see the output of the signalling vector filter 610) and is applied to a bank 708 of correlation receivers $708_1$–$708_M$. Each of the correlation receivers $708_1$14 $708_M$ of the bank of correlation receivers 708 uses a corresponding decode word in order to decode the data vector at a data rate of 168 kbits per second. The decode words are the complex conjugates of the code words which are used to transmit data to the head end 102.

Figures 8, 9, 10:
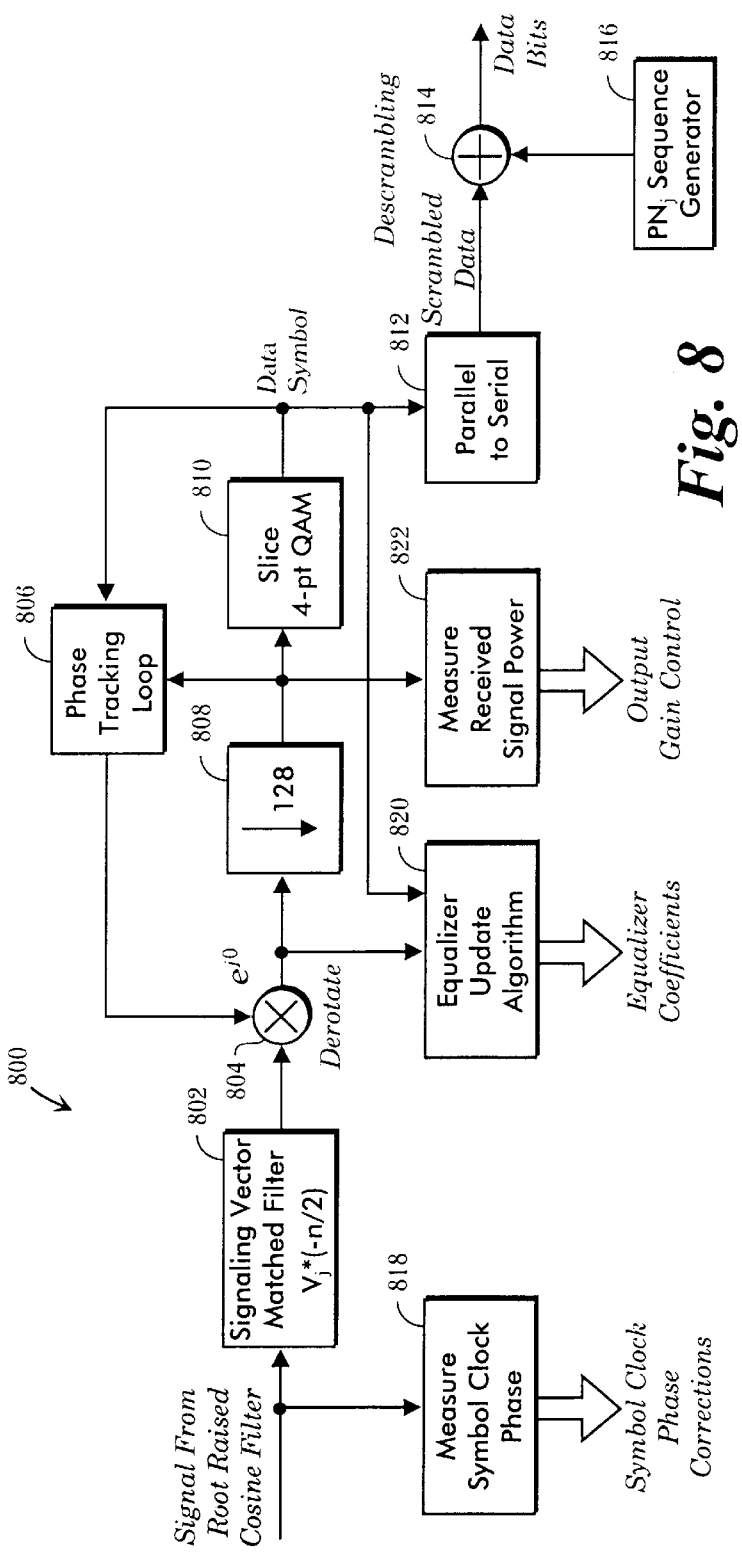
FIG. 8 illustrates a portion of FIG. 7 in greater detail.
FIGS. 9 and 10 illustrate two examples of data packets which may be used to communicate data along the communication system of the present invention; and, FIG. 11 illustrates a simplified upstream SCDMA modulator which may be used with the present invention.

A representative one of the correlation receivers $708_1$–$708_M$ is shown in FIG. 8. This correlation receiver 800 includes a filter 802 which correlates the data vector at the output of the root raised cosine filter 706 to the decode word which is assigned to the correlation receiver 800. Accordingly, the filter 802 provides the data symbols formed by the mapper 606. The output of the filter 802 is derotated by a multiplier 804 in order to correct for carrier phase errors. The multiplier 804 receives one input from the output of the filter 802, and another input from a phase tracking loop 806.

The output of the multiplier 804 is decimated by 128 by a decimator 808. Accordingly, the signal from the multiplier 804 is sampled at the correct sampling instant. The output from the decimator 808 is sliced to the original 4 point QAM/QPSK constellation by a slicer 810 in order to derived the original two randomized bits per symbol.

The data bits are then multiplexed back to the original 168 kbits per second by a parallel to serial register 812, and are de-randomized by a de-randomizer 814 which receives both the stream of data bits from the parallel to serial register 812 and the $PN_j$ sequence from a $PN_j$ sequence generator 816. The output of the de-randomizer 814 contains the data bits which were supplied to the randomizer 602 of FIG. 6.

The correlation receiver 800 at the head end 102 must also monitor and correct the operation of the upstream transmitters of the subscriber stations. Accordingly, the correlation receiver 800 contains a block 818 to measure the symbol clock phase, a block 820 to determine the equalizer coefficients C(n), and a block 822 to determine the gain setting for the gain control 620 of the upstream modulator 504 illustrated in FIG. 6. The symbol clock phase, the equalizer coefficients, and the gain setting are transmitted by the head end 102 to the subscriber station 106.

The data which is transmitted upstream between the head end 102 and the subscriber station 106 may be transmitted in a data packet having the structure shown in FIG. 9. This data packet has a two byte preamble followed by a five byte header and a 48 byte payload (i.e., 48 bytes of data). The data packet also has eight bytes of Reed-Solomon parity.

An alternative data packet for IEEE-802.3 packets is shown in FIG. 10. This data packet also includes two bytes of preamble and eight bytes of Reed-Solomon parity. In addition, this data packet includes twelve bytes of destination and source addresses, two bytes of length/type field information, and 39 bytes of data.

The system disclosed herein may use either one of these data formats and, therefore, utilizes a data packet of 63 bytes. The eight bytes of Reed-Solomon parity yields a T=4 code. Other schemes are possible including the addition of trellis coded modulation.

Certain modifications of the present invention have been discussed above. Other modifications will occur to those practicing in the art of the present invention. For example, the invention has been described herein with particular reference to a cable television system. However, it should be understood that the present invention has applicability to other types of communication systems as well.

Figure 11:
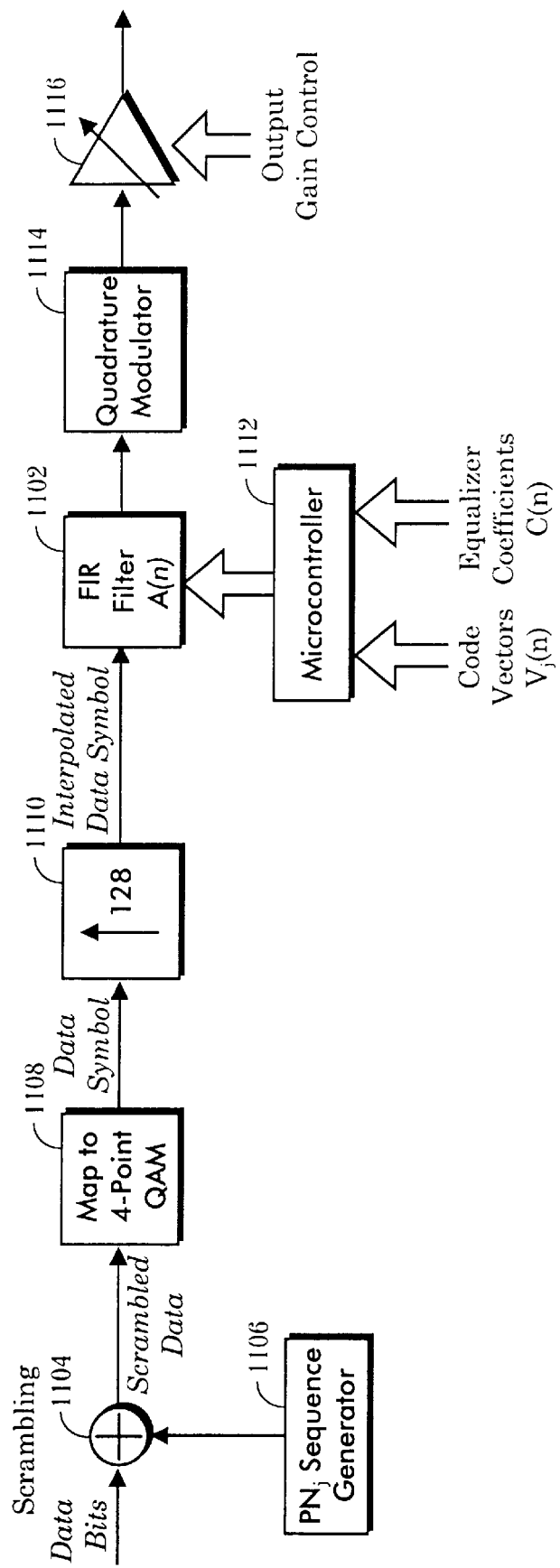

Also, a simplified transmitter as illustrated in FIG. 11 can be implemented in place of that shown in FIG. 6 by pre-computing the convolution between the code word $V_j(n)$, the equalizer coefficients C(n), and the root raised cosine filter. Accordingly, the response of this combined filter may be implemented in a single FIR filter 1102. The transmitter shown in FIG. 11 further includes a randomizer 1104 similar to the randomizer 602 shown in FIG. 6, a $PN_j$ sequence generator 1106 similar to the $PN_j$ sequence generator 604 shown in FIG. 6, a mapper 1108 similar to the mapper 606 shown in FIG. 6, and an interpolator 1110 which combines the functions of both of the interpolators 608 and 612 shown in FIG. 6. The FIR filter 1102 then replaces the signalling vector filter 610, the T/2 pre-equalizer 614, and the root raised cosine filter 616 shown in FIG. 6. The FIR filter 1102 responds to a microcontroller 1112 which receives a code word $V_j(n)$, which is assigned to the particular transmitter, and the equalizer coefficients C(n). The microcontroller 1112 thus controls the FIR filter 1102 according to the code word $V_j(n)$ and the equalizer coefficients C(n) in order to produce a pre-equalized data vector similar to that shown in FIG. 6. The FIR filter 1102 also performs the function of the root raised cosine filter 616 shown in FIG. 6. The output of the FIR filter 1102 is modulated by a quadrature modulator 1114, and the output of the quadrature modulator 1114 is adjusted by a gain control circuit 1116.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of transmitting a data signal over a communication channel comprising the steps of:
   selecting a set of substantially orthogonal code words such that each code word in the set of substantially orthogonal code words is minimally correlated with a characteristic of the communication channel; and,
   using a code word of the set of code words in order to transmit the data signal over the communication channel.

2. The method of claim 1 wherein one of the characteristics is noise on the communication channel, and wherein the step of selecting a set of substantially orthogonal code words comprises the step of selecting a set of substantially orthogonal code words such that each code word in the set of substantially orthogonal code words is minimally correlated with the noise on the communication channel.

3. The method of claim 1 wherein the step of selecting a set of substantially orthogonal code words comprises the step of sampling the characteristic of the communication channel.

4. The method of claim 3 wherein the step of selecting a set of substantially orthogonal code words comprises the step of determining a correlation matrix based upon the characteristic samples.

5. The method of claim 4 wherein the step of selecting a set of substantially orthogonal code words comprises the step of determining an orthonormal random matrix.

6. The method of claim 5 wherein the step of selecting a set of substantially orthogonal code words comprises the step of determining the set of substantially orthogonal code words based upon the correlation matrix and the orthonormal random matrix.

7. The method of claim 6 wherein the step of determining a correlation matrix based upon the characteristic samples comprises the step of determining eigenvalues and eigenvectors of the correlation matrix.

8. The method of claim 7 wherein the step of determining the eigenvalues and eigenvectors of the correlation matrix comprises the steps of summing the eigenvalues until an average of the summed eigenvalues is greater than a predetermined threshold and of selecting the summed eigenvalues and their corresponding eigenvectors.

9. The method of claim 8 wherein the step of determining the set of substantially orthogonal code words based upon the correlation matrix and the orthonormal random matrix comprises the step of determining a set of substantially orthogonal code vectors based upon the orthonormal random matrix and the selected eigenvectors.

10. The method of claim 9 wherein the step of determining the set of substantially orthogonal code vectors comprises the step of sorting the substantially orthogonal code vectors based upon relative expected characteristic power.

11. The method of claim 10 wherein the step of determining the set of substantially orthogonal code vectors comprises the step of rotating the sorted substantially orthogonal code vectors in pairs until the relative expected characteristic power converges to substantially a total average expected characteristic power.

12. A method of transmitting a data signal over a communication channel comprising the steps of:
    selecting a set of substantially orthogonal code words such that each code word in the set of substantially orthogonal code words is minimally correlated with noise on the communication channel;
    multiplying the data signal by a code word of the set of substantially orthogonal code words in order to produce a spread data signal; and,
    transmitting the spread data signal over the communication channel.

13. The method of claim 12 wherein the step of selecting a set of substantially orthogonal code words comprises the step of sampling the noise on the communication channel.

14. The method of claim 13 wherein the step of sampling the noise on the communication channel comprises the step of periodically sampling the noise characteristics in order to recompute the substantially orthogonal code words as the noise changes.

15. The method of claim 13 wherein the step of selecting a set of substantially orthogonal code words comprises the step of determining a noise correlation matrix based upon the noise samples.

16. The method of claim 15 wherein the step of selecting a set of substantially orthogonal code words comprises the step of determining an orthonormal random matrix.

17. The method of claim 16 wherein the step of selecting a set of substantially orthogonal code words comprises the step of determining the set of substantially orthogonal code words based upon the noise correlation matrix and the orthonormal random matrix.

18. The method of claim 17 wherein the step of determining a noise correlation matrix based upon the noise samples comprises the step of determining eigenvalues and eigenvectors of the noise correlation matrix.

19. The method of claim 18 wherein the step of determining the eigenvalues and eigenvectors of the noise correlation matrix comprises the steps of summing the eigenvalues until an average of the summed eigenvalues is greater than a predetermined threshold and of selecting the summed eigenvalues and their corresponding eigenvectors.

20. The method of claim 19 wherein the step of determining the set of substantially orthogonal code words based upon the noise correlation matrix and the orthonormal random matrix comprises the step of determining a set of substantially orthogonal code vectors based upon the orthonormal random matrix and the selected eigenvectors.

21. The method of claim 20 wherein the step of determining the set of substantially orthogonal code vectors comprises the step of sorting the substantially orthogonal code vectors based upon relative expected noise power.

22. The method of claim 21 wherein the step of determining the set of substantially orthogonal code vectors comprises the step of rotating the sorted substantially orthogonal code vectors in pairs until the relative expected noise power converges to substantially a total average expected noise power.

23. An apparatus for transmitting a data signal over a communication channel comprising:
    means for determining a set of substantially orthogonal code words such that each code word in the set of substantially orthogonal code words is minimally correlated with noise on the communication channel;

means for modulating the data signal with a code word of the set of substantially orthogonal code words; and, means for transmitting the modulated data signal over the communication channel.

24. The apparatus of claim 23 wherein the means for determining a set of substantially orthogonal code words comprises means for sampling the noise on the communication channel.

25. The apparatus of claim 24 wherein the means for determining a set of substantially orthogonal code words comprises means for determining a noise correlation matrix based upon the noise samples.

26. The apparatus of claim 25 wherein the means for determining a set of substantially orthogonal code words comprises means for determining an orthonormal random matrix.

27. The apparatus of claim 26 wherein the means for determining a set of substantially orthogonal code words comprises means for determining the set of substantially orthogonal code words based upon the noise correlation matrix and the orthonormal random matrix.

28. The apparatus of claim 27 wherein the means for determining a noise correlation matrix based upon the noise samples comprises means for determining eigenvalues and eigenvectors of the noise correlation matrix.

29. The apparatus of claim 28 wherein the means for determining the eigenvalues and eigenvectors of the noise correlation matrix comprises means for summing the eigenvalues until an average of the summed eigenvalues is greater than a predetermined threshold and for selecting the summed eigenvalues and their corresponding eigenvectors.

30. The apparatus of claim 29 wherein the means for determining the set of substantially orthogonal code words based upon the noise correlation matrix and the orthonormal random matrix comprises means for determining a set of substantially orthogonal code vectors based upon the orthonormal random matrix and the selected eigenvectors.

31. The apparatus of claim 30 wherein the means for determining the set of substantially orthogonal code vectors comprises means for sorting the substantially orthogonal code vectors based upon relative expected noise power.

32. The apparatus of claim 31 wherein the means for determining the set of substantially orthogonal code vectors comprises means for rotating the sorted substantially orthogonal code vectors in pairs until the relative expected noise power converges to substantially a total average expected noise power.

33. A receiver for receiving a data vector over a communication channel, wherein the data vector is a combination of a code vector and data, wherein the code vector is minimally correlated with a characteristic of the communication channel, the receiver comprising:

means for receiving the data vector; and, means for applying a code word to the data vector, wherein the code word is related to the code vector so that, when the code word is applied to the data vector, the data is recovered from the data vector.

34. The receiver of claim 33 wherein the characteristic is noise on the communication channel, and wherein the code vector is minimally correlated with the noise on the communication channel.

35. The receiver of claim 33 wherein the characteristic is noise on the communication channel, and wherein the code vector is one of a set of substantially orthogonal code vectors such that each code vector in the set of substantially orthogonal code vectors is minimally correlated with the noise on the communication channel.

36. The receiver of claim 35 wherein the set of substantially orthogonal code vectors is determined from a correlation matrix based upon the noise on the communication channel.

37. The receiver of claim 36 wherein the set of substantially orthogonal code vectors is determined from an orthonormal random matrix.

38. The receiver of claim 37 wherein the set of substantially orthogonal code vectors is determined from eigenvalues and eigenvectors of the correlation matrix.

39. The receiver of claim 38 wherein the eigenvectors are determined by summing eigenvalues of the correlation matrix until an average of the summed eigenvalues is greater than a predetermined threshold, and by selecting those eigenvectors corresponding to the summed eigenvalues.

40. The receiver of claim 39 wherein the set of substantially orthogonal code vectors is determined from the orthonormal random matrix and the selected eigenvectors.

41. The receiver of claim 40 wherein the substantially orthogonal code vectors of the set of substantially orthogonal code vectors are sorted based upon relative expected characteristic power.

42. The receiver of claim 41 wherein the substantially orthogonal code vectors in the set of sorted substantially orthogonal code vectors are rotated in pairs until the relative expected characteristic power converges to substantially a total average expected characteristic power.

43. An apparatus for transmitting a data signal over a communication channel comprising:

means for modulating the data signal with a code word, wherein the code word is selected from a set of substantially orthogonal code words, and wherein the code word is minimally correlated with noise on the communication channel; and, means for transmitting the modulated data signal over the communication channel.

44. The apparatus of claim 43 wherein the code word is determined from a noise correlation matrix based upon the noise on the communication channel.

45. The apparatus of claim 44 wherein the code word is determined from an orthonormal random matrix.

46. The apparatus of claim 45 wherein the set of substantially orthogonal code words is determined from eigenvalues and eigenvectors of the noise correlation matrix.

47. The apparatus of claim 46 wherein the eigenvectors of the noise correlation matrix are determined by summing the eigenvalues of the noise correlation matrix until an average of the summed eigenvalues is greater than a predetermined threshold, and by selecting those eigenvalues corresponding to the summed eigenvalues.

48. The apparatus of claim 47 wherein the set of substantially orthogonal code words is determined from the orthonormal random matrix and the selected eigenvectors.

49. The apparatus of claim 48 wherein the substantially orthogonal code vectors of the set of substantially orthogonal code vectors are sorted based upon relative expected noise power.

50. The apparatus of claim 49 wherein the substantially orthogonal code vectors of the set of substantially orthogonal code vectors are rotated in pairs until the relative expected noise power converges to substantially a total average expected noise power.

51. A method of decoding a data vector received over a communication channel, wherein the data vector comprises data converted to the data vector by a code vector, wherein the code vector is minimally correlated with noise oil the communication channel, wherein the method comprises the following steps:

correlating the data vector to a decode word to produce a correlation result, wherein the decode word is related to the code vector; and, recovering the data from the correlation result.

52. The method of claim 51 wherein the decode word is a complex conjugate of the code vector.

53. The method of claim 52 wherein the recovering step comprises the step of derotating the correlation result.

54. The method of claim 53 wherein the recovering step comprises the step of decimating the derotated correlation result.

55. The method of claim 54 wherein the recovering step comprises the step of descrambling the decimated and derotated correlation result.

56. The method of claim 51 wherein the correlating step comprises the step of quadrature demodulating the data vector.

57. The method of claim 56 wherein the correlating step comprises the stop of root-raised cosine filtering the quadrature demodulated data vector.

58. The method of claim 57 wherein the correlating step comprises the step of correlating the root-raised cosine filtered and quadrature demodulated data erector to the decode word.

* * * * *